Feb. 9, 1926.

W. R. HIRT 1,572,797

WOODWORKING MACHINE

Filed Nov. 2, 1922 4 Sheets-Sheet 1

Inventor
William R. Hirt

By
Attorney

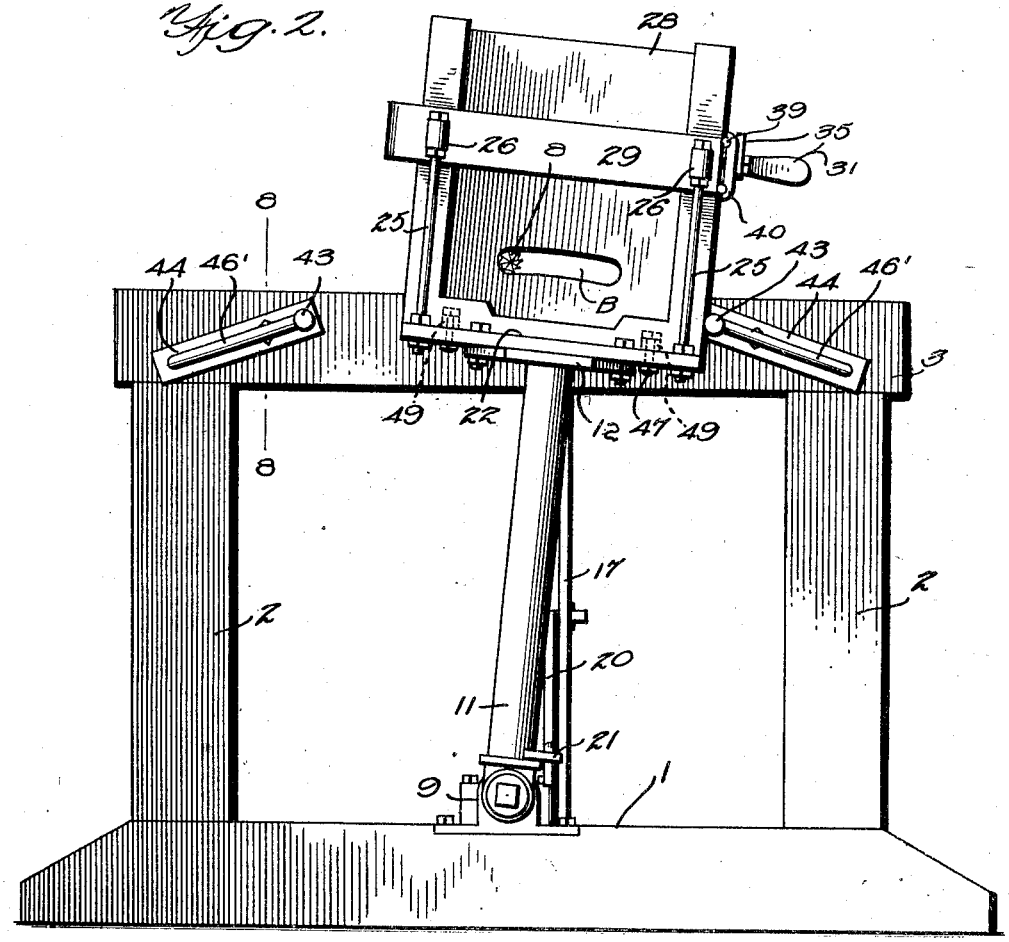

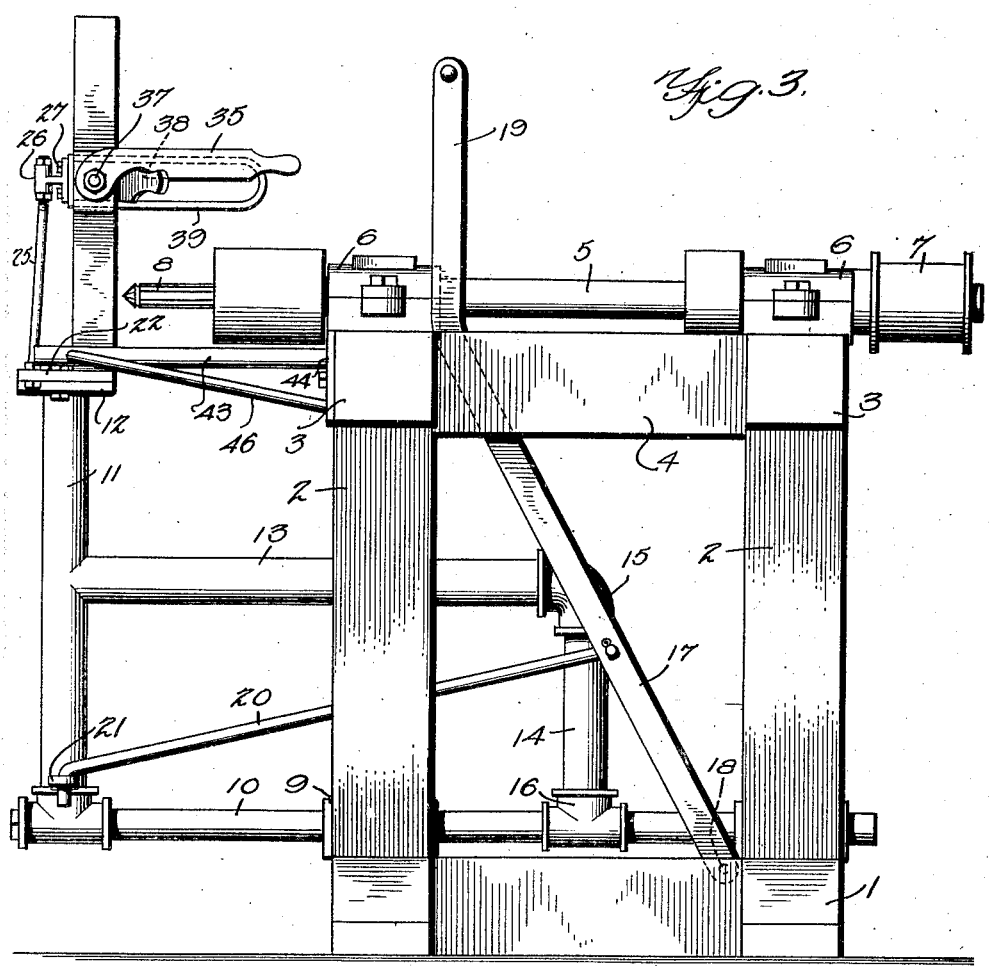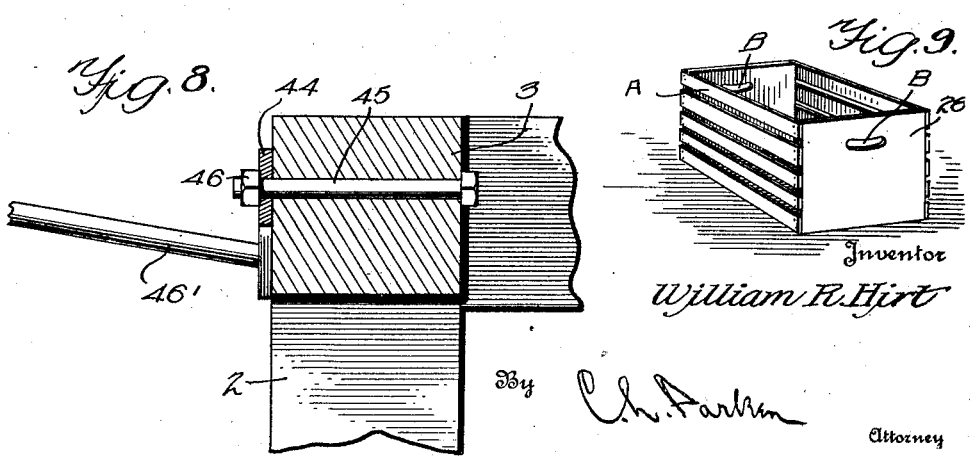

Feb. 9, 1926.
W. R. HIRT
1,572,797
WOODWORKING MACHINE
Filed Nov. 2, 1922
4 Sheets-Sheet 4
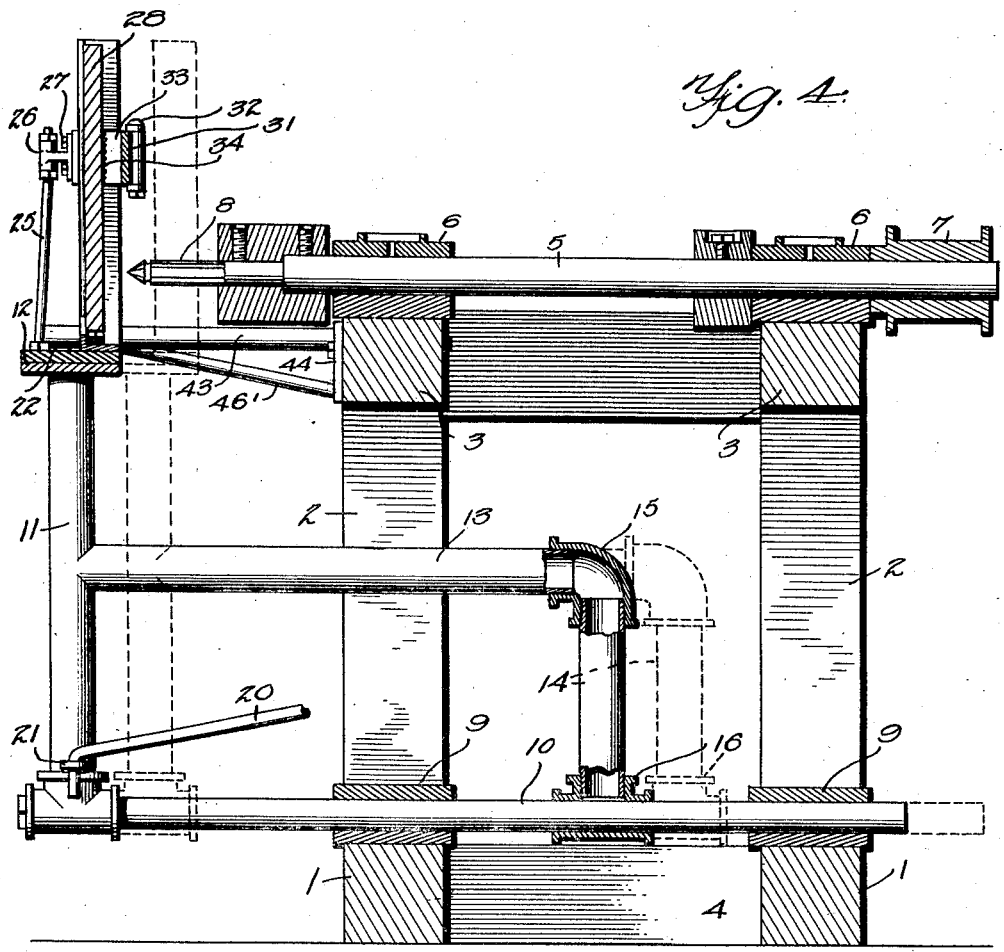
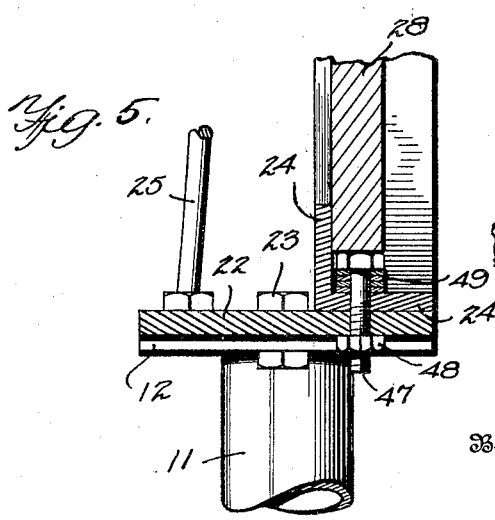
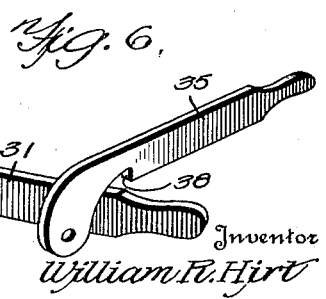
Inventor
William R. Hirt
By Ch. Fairbn
Attorney Patented Feb. 9, 1926.

1,572,797

UNITED STATES PATENT OFFICE.

WILLIAM R. HIRT, OF DEERBROOK, WISCONSIN.

WOODWORKING MACHINE.

Application filed November 2, 1922. Serial No. 598,659.

*To all whom it may concern:*

Be it known that I, WILLIAM R. HIRT, a citizen of the United States, residing at Deerbrook, in the county of Langlade and State of Wisconsin, have invented certain new and useful Improvements in Woodworking Machines, of which the following is a specification.

This invention relates to wood working machines, and more particularly to a machine for cutting hand holes in the end boards of crates.

In the manufacture of potato and apple crates, it is the usual practice to provide hand holes in the end of the crate by means of which the crate may be readily lifted. It has heretofore been the practice to employ ordinary boring machines, and chisel mortisers in this operation, cutting a number of different holes overlapping each other to provide an oblong hole large enough to accommodate a person's hand. After the cutting operation, the edges are smoothed down in any desired manner.

In the present invention, I provide a machine consisting of a boring tool and a header or support for the end board. The header is adjustable longitudinally of the cutting tool to permit the cutting tool to be brought into operative position with respect to the end board and is further adjustable through an arc of a circle to permit of a curved oblong hole having rounded ends to be cut into the end board.

An object of the invention is the provision of means for supporting a header whereby it may be adjusted longitudinally and swung on a pivot.

A further object is the provision of means for adjustably supporting the end board to permit the distance of the hole from the top of the end board to be varied.

A further object is the provision of means for limiting the arcuate movement of the header to control the size of the opening cut.

Figure 1:
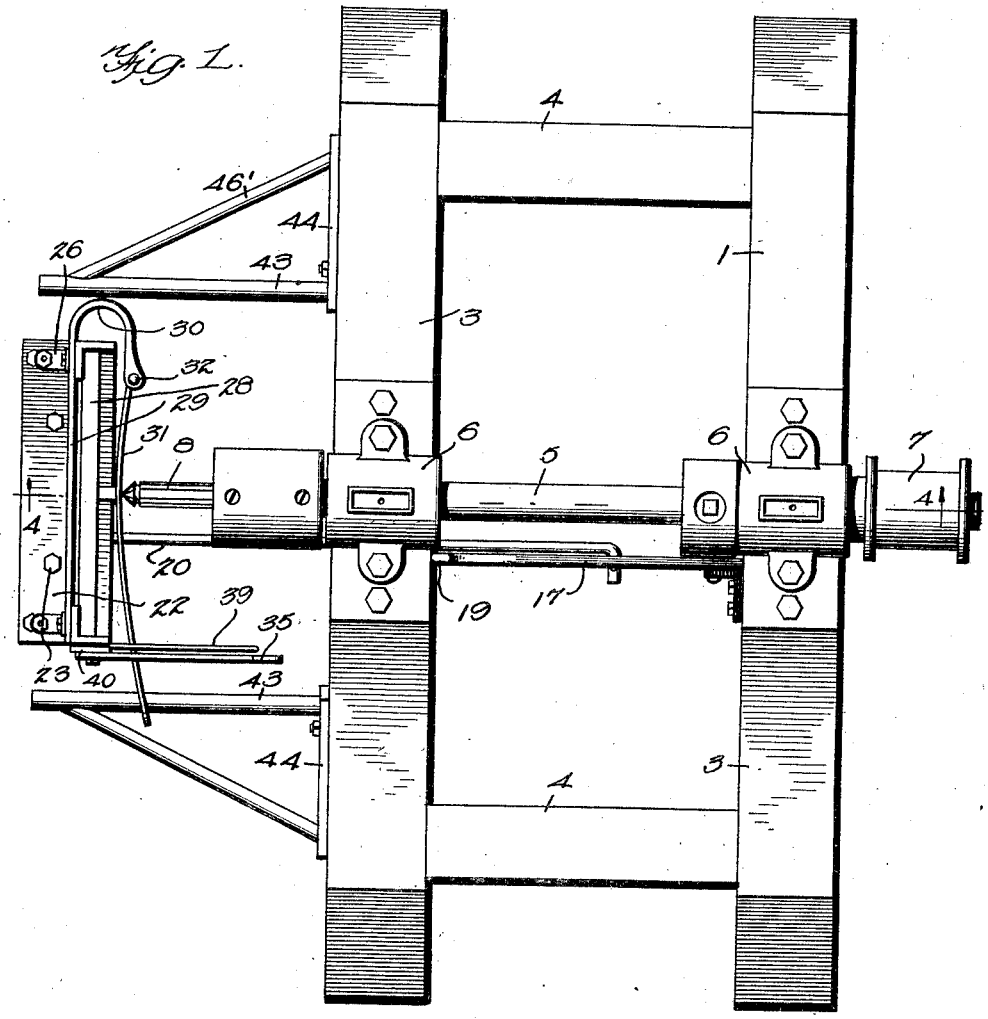
Figure 10:
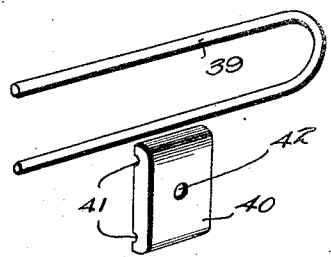

In the accompanying drawings, I have shown one embodiment of the invention. In this showing:

Figure 1 is a plan view of the machine,
Figure 2 is an end elevation,
Figure 3 is a side elevation,
Figure 4 is a vertical longitudinal sectional view on line 4—4 of Figure 1,
Figure 5 is a detail view of a portion of the header showing the means for adjusting the position of the end board.
Figure 6 is a detail view of the locking mechanism for retaining the end board in the header,
Figure 7 is a plan view of the header removed from the machine,
Figure 8 is a detail sectional view on line 8—8 of Figure 2,
Figure 9 is a perspective view of a finished crate, and,
Figure 10 is a detail view of a guide member forming a part of the locking mechanism by means of which the end board is retained in the header.

Referring to the drawings, the reference numeral 1 designates a suitable base or foundation consisting of floor sills and connecting members. Legs 2 are mounted on the base and the upper ends of the legs are connected by transverse members 3, and longitudinal members 4. A main shaft 5 is mounted in suitable bearings 6, carried by the transverse members and this shaft is provided with a pulley 7 adapted to receive a belt (not shown) connected to a suitable source of power. The shaft, of course, may be driven in any other suitable manner. A suitable cutting tool 8 is carried on the other end of the shaft.

A second pair of bearings 9 are mounted on the base of the machine beneath the main bearings. A shaft 10 is slidably mounted in these bearings. A standard 11 is mounted on the inner end of the shaft and is adapted to receive a header block 12. As shown, the header shaft may be reenforced by means of an arm 13 extending from the standard substantially parallel to the shaft and connected to a vertical member 14 by means of a fitting 15. The lower end of the vertical member is connected to the shaft by a fitting 16. The shaft 10 is movable longitudinally of the machine by means of a control lever 17, pivoted to the base of the machine at 18, and provided with an operating handle 19. This lever is provided with an arm 20, connected to an ear 21 on the standard 11.

The header consists of a substantially flat plate 22 which is secured to the standard in any suitable manner, as by bolts 23. This plate is adapted to receive and support a three-sided end board supporting member formed of angle irons 24. As shown, the supporting member is substantially rectangular and is open at the top. The supporting member is connected to the plate 22 by means of braces 25, the upper ends of which are received in sleeves 26, secured to the vertical angle irons, as at 27.

An end board 28 is inserted in the supporting member from the top and is retained in position by means of a suitable locking device. As shown, the locking device consists of a strap or plate 29 extending around the back of the support and provided with a curved portion 30 at one end. The end of the curved portion is arranged in front of the angle irons and is adapted to pivotally receive a locking lever 31, the locking lever being mounted on a pivot pin 32. This lever is provided with a dog 33 having teeth 34 adapted to engage the surface of the end board to retain it in position. A latch 35 is pivoted on the vertical arm of the supporting member, as at 37, and this latch is provided with a tooth 38, adapted to engage locking lever 31. The locking lever is received in a guide formed of wire or other suitable material and consisting of a substantially U-shaped member 39. This member is clamped to the adjacent angle iron by means of a clamping plate 40 (see Figure 10) which is provided with recesses 41 for the reception of the arms of the guide and is further provided with an opening 42 for the reception of the bolt 37. The bolt 37 forms a pivot for the arm 35 and also retains the plate 40 in position.

Means are provided for limiting the arcuate movement of the header and end board. Stops 43 are arranged on the transverse member 3, the stops consisting of arms projecting into the path of the header to limit the movement thereof. These arms are secured to plates 44, which are connected to the frame of the machine by bolts 45. The bolts are provided with nuts 46 which may be loosened to permit the plate to be swung about the bolt as an axis to adjust the position of the stop and control the size of the hand hole opening cut in the end board. Suitable braces 46' are connected to the stop arms 43 and the plates 44.

The distance between the top of the end board and the hole cut therein may be regulated by means of bolts 47 which pass through the plate 22 and the bottom angle iron 24 of the end board support. These bolts are provided with nuts 48 and are adapted to receive washers 49 by means of which the distance between the angle iron member and the head of the bolt may be regulated. The end board rests upon the heads of the bolts when it is in position.

In operation, the end board is inserted in the holder and the locking member moved to operative position to cause the dog 33 to engage the end board as shown in Figure 4 of the drawings. The latch 38 then engages the locking member to prevent accidental displacement of the end board. After the end board has been arranged in position, the header is moved inwardly by swinging the lever 17 on its pivot and the boring tool 8 passes through the end board with the parts in the dotted line position shown in Figure 1 of the drawings. By rocking the header through an arc of a circle with the shaft 10 turning in the bearings 9, a boring tool is caused to cut a hole similar to that shown in Figure 2 of the drawings. The stops 43 limit the arcuate movement of the header and thus control the size of the opening cut. In carrying out the operation, I find it most efficient to first pierce the end board at the point where one end of the hand hole opening is to be cut with the header in engagement with one of the stops and then swing the header through its entire path of movement to the position shown in Figure 2 of the drawings, which completes the cutting operation. By loosening the bolts 45, and adjusting the stops 43, the size of the opening may be varied. In Figure 9 of the drawings, I have shown a crate A having end boards 28 in which openings B have been cut. It will be noted that the end boards are in an inverted position when they are in the machine and that the openings are arranged near the top of the end boards curving upwardly from the center to the ends. The vertical position of the openings may be regulated by means of washers 49.

It is to be understood that the form of the invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In a machine for cutting hand holes in end boards of crates, a frame, a rotatable shaft carried by said frame and projecting beyond one end thereof, a cutting element mounted on the projecting end of said shaft, a slidable shaft carried by said frame below and parallel to said first named shaft and adapted to oscillate, a standard carried by said slidable shaft outwardly of said frame and adjacent said cutting element, a plate arranged on the uppper end of said standard, a pair of spaced upstanding arms carried by said plate, means for clamping an end board to said arms, and a pair of substantially horizontal arms carried by said frame and projecting from the end thereof on opposite sides of said upstanding arms, said horizontal arms being adapted to contact with said upstanding arms to limit the oscillating movement of said slidable shaft throughout its sliding movement.

2. A device constructed in accordance with claim 1 wherein said plate is provided with vertically adjustable means for supporting the lower edge of an end board.

3. A device constructed in accordance with claim 1 wherein the means for clamping an end board to said arms comprises a resilient member pivotally connected at one end to one of said upstanding arms and adapted to contact with an end board arranged thereagainst, and means for maintaining the free end of said clamping member in clamping position.

In testimony whereof, I affix my signature.

WILLIAM R. HIRT.